United States Patent
Jamison et al.

(10) Patent No.: US 12,085,524 B2
(45) Date of Patent: Sep. 10, 2024

(54) SAG DETECTION USING THERMAL CONDUCTIVITY

(71) Applicant: Halliburton Energy Services, Inc., Houston, TX (US)

(72) Inventors: Dale E. Jamison, Houston, TX (US); Andrew Vos, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 17/968,074

(22) Filed: Oct. 18, 2022

(65) Prior Publication Data

US 2024/0125722 A1 Apr. 18, 2024

(51) Int. Cl.
*G01N 25/18* (2006.01)
*E21B 21/01* (2006.01)
*G01N 11/00* (2006.01)

(52) U.S. Cl.
CPC ............. *G01N 25/18* (2013.01); *E21B 21/01* (2013.01); *G01N 2011/0093* (2013.01)

(58) Field of Classification Search
CPC . G01N 25/18; G01N 2011/0093; E21B 21/01
See application file for complete search history.

(56) References Cited

U.S. PATENT DOCUMENTS

| | | | |
|---|---|---|---|
| 4,575,260 A * | 3/1986 | Young | E21B 47/07 73/152.13 |
| 6,584,833 B1 | 7/2003 | Jamison et al. | |
| 6,931,916 B2 | 8/2005 | Zamora et al. | |
| 7,845,212 B1 | 12/2010 | Bi | |
| 8,387,442 B2 | 3/2013 | Jamison et al. | |
| 8,635,902 B2 | 1/2014 | Jamison et al. | |
| 8,640,530 B2 | 2/2014 | Jamison et al. | |
| 8,752,414 B2 | 6/2014 | Jamison et al. | |
| 10,914,664 B1 | 2/2021 | Miller et al. | |
| 2013/0048623 A1* | 2/2013 | Jamison | G01N 33/383 432/112 |

(Continued)

OTHER PUBLICATIONS

Foreign Communication from Related Application—International Search Report and Written Opinion of the International Searching Authority, International Application No. PCT/US2023/029679, dated Dec. 1, 2023, 11 pages.

*Primary Examiner* — Kristina M Deherrera
*Assistant Examiner* — Jean F Morello
(74) *Attorney, Agent, or Firm* — Conley Rose, P.C.; Rodney B. Carroll

(57) ABSTRACT

A sag detection apparatus comprises an oven containing a sample cell supported by a cell support structure, a thermal conductivity sensor including a sensor housing, and a roller with a first end supported by a first bearing and fixedly coupled to a first end of the cell support structure and a second end supported by a second bearing and fixedly coupled to a second end of the cell support structure. Temperature sensor wires electrically connect a temperature sensor and first fixed contact via stationary contacts configured to remain fixed during rotation of the roller and rotating contacts configured to rotate with rotation of the roller. Heat source wires electrically connect a heat source and a second fixed contact via stationary contacts configured to remain fixed during rotation of the roller and rotating contacts configured to rotate with rotation of the roller.

20 Claims, 2 Drawing Sheets

(56) References Cited

U.S. PATENT DOCUMENTS

| | | |
|---|---|---|
| 2014/0216149 A1 | 8/2014 | Zhou et al. |
| 2016/0356919 A1 | 12/2016 | Jamison et al. |
| 2018/0003607 A1 | 1/2018 | Gajji et al. |
| 2021/0372905 A1 | 12/2021 | LeBlanc |

* cited by examiner

SAG DETECTION USING THERMAL CONDUCTIVITY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to wellbore drilling. More specifically, the present disclosure relates to measuring sag of a wellbore servicing fluid (e.g., a drilling fluid or drilling "mud"). Still more specifically, the present disclosure relates to an apparatus and method for sag detection using thermal conductivity.

BACKGROUND

Fluids used in wellbore servicing operations may contain a variety of additives, including without limitation barite that may be used as a weighting agent or material in drilling fluids. Sag (e.g. barite sag), the localized concentration of weighting agent (e.g., barite), is caused by complex fluid dynamics during drilling operations. Most often the phenomenon occurs in inclined wellbores during trips or casing/liner runs when low fluid flow velocity conditions persist downhole. (Barite) sag can be a serious issue because the resulting uneven density of the fluid column in the wellbore can compromise the operator's ability to easily control well pressures. Fluids which can be utilized to avoid barite sag present a major benefit in terms of safety and reliability, as well a huge economic advantage due to efficiency gains, both in well designs to maximize reservoir exposure and the spend to execute drilling programs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
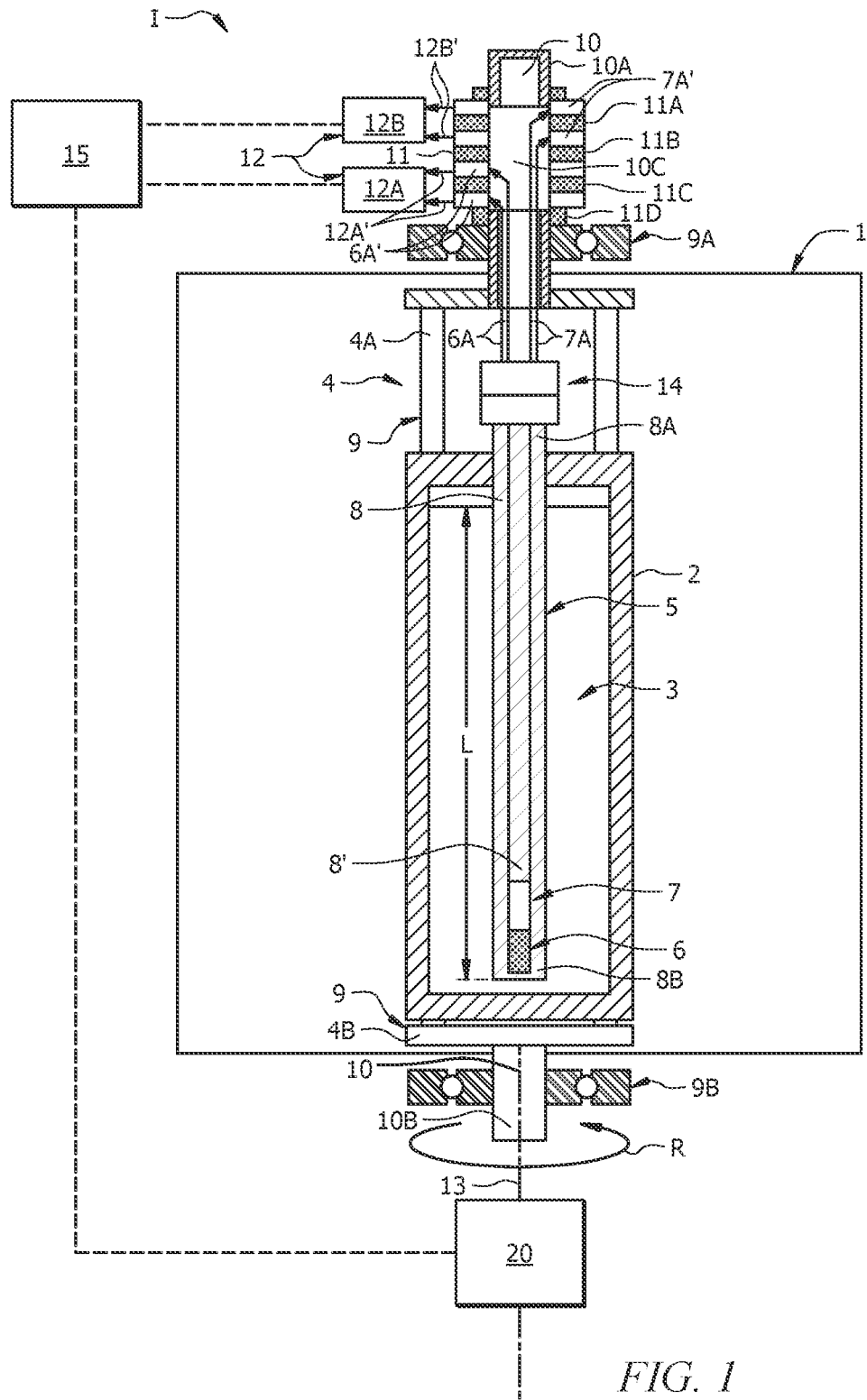
FIG. 1 is a schematic of a sag detection apparatus, according to embodiments of this disclosure.

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, sag is defined as the change in density of a suspension due to the settling of solid particles not completely suspended in the fluid by fluid rheology. Such solid particles can include, for example, particles added to the fluid to intentionally control the density of the fluid, for example, without limitation, barite. As the particles settle, the depleted zones become less dense, and zones of greater density form near the bottom of a fluid volume. If the fluid volume is inclined relative to vertical, the settling rate is increased due to density gradients in the fluid causing currents resulting in enhanced settling of the denser fluid to the bottom while displacing lighter fluid to the top. This type of enhanced settling is commonly known as the Boycott effect. This effect can occur in inclined wellbores. The angle of the incline of the roller in the roller oven can alter the particle settling rate and provide a means to measure the enhanced settling rates useful in wellbore pressure modeling.

As utilized herein, the phrase "coupled" indicates coupling of one component to another, either directly or indirectly. That is, a first component coupled to a second component can be coupled directly to the second component, or can be coupled indirectly to the second component, for example, via a third or more components.

Roller ovens can be utilized to measure the tendency of drilling fluids to sag. Conventional roller ovens do not provide for real time measurement of sag. Disclosed herein are an apparatus and method for measuring the sag event in real time while testing, via a thermal conductivity sensor within the oven. Via this disclosure, a sag event can be recorded, the settling velocity calculated, and the density change in the fluid calculated substantially in real time. This thermal conductivity measurement feature provided by the herein disclosed apparatus and method eliminates the need for tedious manual density measurements conventionally performed subsequent a test cycle.

Via this disclosure, thermal conductivity sensor(s) can be placed within a sample cell utilizing seals and fixtures that can allow the sample cell to be pressurized. The "roller" supporting the cell is positioned in the oven such that slip rings can be engaged at one end of the "roller". The slip rings provide the electrical connections to continuously measure temperature and thermal conductivity. After thermal conductivity is measured, the sagged density of the fluid can be computed using the different thermal properties of the fluid components and the change in thermal conductivity due to the higher concentration of weighting agent (e.g., barite) in a lower region of the sample cell.

In embodiments, a fluid can be pretested to determine the changes in thermal conductivity with density changes only. This data may be utilized to characterize the sagged fluid density in the test using a derived function such as that of Equation (1), which calculates the density as a function of the measured thermal conductivity:

$$\text{Density} = f(\text{thermal conductivity}) \qquad \text{(Eq. 1)}.$$

Description of a sag detection apparatus (also referred to herein simply as an "apparatus") will now be made with reference to FIG. 1, which is a schematic of an apparatus I of this disclosure. Apparatus I comprises: an oven 1 having contained therein a sample cell 2. Sample cell 2 is configured to contain a sample of drilling fluid 3, and the sample cell 2 is supported by a cell support structure 4. Apparatus I further comprises a thermal conductivity sensor 5. Thermal conductivity sensor 5 can comprise a temperature sensor 6, a heat source 7, and a sensor housing 8. Heat source 7 can comprise any heat source suitable for use in a thermal conductivity sensor 5, such as, without limitation, a power resistor. In embodiments, heat source 7 comprises a power resistor, and the power resistor heat source 7 and the power resistor heat source wires 7A comprise a single loop of resistance wire internally along the length of the sensor housing 8.

The temperature sensor 6 and the heat source can be positioned within an interior 8' of the sensor housing 8. The temperature sensor 6 is electrically connected with temperature sensor wires 6A. The power resistor 7 is electrically connected with power resistor wires 7A. Sensor housing 8 is at least partially inserted into the sample cell 2, and the sensor housing 8 has a first end 8A opposite a second end 8B along a central axis 13 of the sample cell 2. Apparatus I further comprises a roller 10. Roller 10 can include a first end 10A opposite a second end 10B along the central axis 13. The first end 10A of the roller 10 can be supported by a first bearing 9A and can be fixedly coupled to or integrated with a first end 4A of the cell support structure 4. The second end 10B of the roller 10 can be supported by a second bearing 9B and can be fixedly coupled to or integrated with a second end 4B of the cell support structure 4.

Apparatus I can further comprise a plurality of slip rings 11 positioned about the first end 10A of the roller 10, and fixed contacts 12 comprising a first fixed contact 12A and a second fixed contact 12B. The temperature sensor wires 6A can electrically connect the temperature sensor 6 and the first fixed contact 12A via stationary contacts 12A' of first fixed contact 12A and rotating contacts 6A'. The stationary contacts 12A' of the first fixed contact 12A are configured to remain fixed during rotation of the roller 10, while the rotating contacts 6A' are configured to rotate with rotation of the roller 10. Each of the stationary contacts 12A' of the first fixed contact 12A can be bounded by a slip ring 11 of the plurality of slip rings 11 (e.g., each of the stationary contacts 12A' of the first fixed contact 12A can have a slip ring 11 on each side thereof).

The heat source wires 7A can electrically connect the power resistor 7 and a second fixed contact 12B via stationary contacts 12B' of the second fixed contact 12B and rotating contacts 7A'. The stationary contacts 12B' of second fixed contact 12B are configured to remain fixed during rotation of the roller 10, while the rotating contacts 7B' are configured to rotate with rotation of the roller 10. Each of the stationary contacts 12B' of the second fixed contact 12B can be bounded by a slip ring 11 of the plurality of slip rings 11 (e.g., each of the stationary contacts 12B' of the second fixed contact 12B can have a slip ring 11 on each side thereof).

Apparatus I can further comprise a plug 14 removably connected to the second end 8B of the sensor housing 8. The temperature sensor wires 6A and the heat source wires 7A can pass through plug 14. Plug 14 can be disconnected from the second end 8B of the sensor housing 8 during loading and unloading of drilling fluid 3 from the sample cell 2.

In embodiments, apparatus I can comprise a plurality of temperature sensors 6 and heat sources (e.g., power resistors) 7 positioned within the interior 8' of the sensor housing 8 along a length L thereof within the sample cell 2. Each of the temperature sensors 6 can be electrically connected, via temperature sensor wires 6A, with the or another first fixed contact 12A via stationary contacts 12A' of the or another first fixed contact 12A and rotating contacts 6A'. Again, the rotating contacts 6A' are configured to rotate with rotation of the roller 10, while the stationary contacts 12A' of the or another first fixed contact 12A are configured to remain fixed during rotation of the roller 10. Each of the stationary contacts 12A' of the or the another first fixed contact 12A can be bounded by a slip ring 11 of the plurality of slip rings 11 (e.g., can have a slip ring 11 on either side thereof). Similarly, each of the heat sources (e.g., power resistors) 7 can be electrically connected, via power resistor wires 7A, with the or another second fixed contact 12B via stationary contacts 12B' of the or the another second fixed contact 12B and rotating contacts 7A'. As noted previously, the rotating contacts 7B' are configured to rotate with rotation of the roller 10, while the stationary contacts 12B' of the or the another second fixed contact 12B are configured to remain fixed during rotation of the roller 10. Each of the stationary contacts 12B' of the or the another second fixed contact 12B can be bounded by a slip ring 11 of the plurality of slip rings 11 (e.g., can have a slip ring 11 on either side thereof).

In embodiments of apparatus I, sample cell 2 is configured to be pressurized during operation. For example, in embodiments, sample cell 2 is configured for operation at pressures in the range of from about 10 to about 100, from about 50 to about 500, from about 100 to about 5000, or greater than or equal to about 100, 500, or 5000 psi. In embodiments, higher pressures can be utilized (e.g., 20-30 ksi)), and the pressure can be limited solely by the design and materials of the apparatus I.

Apparatus I can further comprise a motor 20 configured to rotate sample cell 2 about the central axis 13 of the sample cell 2.

A processor 15 can be electrically coupled with the first fixed contact 12A, the second fixed contact 12B, thermal conductivity sensor 5, and the motor 20. The processor 15 can be configured to control operation of the thermal conductivity sensor 5 and the motor 20 via a programmed method for sag determination. The method can be stored in a memory of the processor 15. Processor 15 is further configured to process electrical signals received from the thermal conductivity sensor 5 to provide a measured thermal conductivity and determine a sag of the drilling fluid 3 utilizing the measured thermal conductivity. Processor 15 can be configured to determine a density of the drilling fluid 3 as a function of the thermal conductivity measured with thermal conductivity sensor 5 of apparatus I. In embodiments, apparatus I is operable to determine the sag substantially in real time.

In embodiments, apparatus I is configured to determine thermal conductivity measurements at a plurality of locations within the sample cell 2, for example, via a plurality of thermal conductivity sensors 5 (e.g., a plurality of temperature sensors 6 and associated heat sources (e.g., power resistors) 7) and/or via the use of an axially movable thermal conductivity sensor 5 configured to take thermal conductivity measurements at the plurality of locations within the sample cell 2.

Also provided herein is a system comprising: the apparatus I; a processor 15 with a memory. The memory stores a processing application, which, when executed on the processor, configures the processor to: substantially continuously or periodically receive signals from the apparatus I to provide a measured thermal conductivity; and calculate (e.g., estimate or model) a sag of the drilling fluid 3 from the measured thermal conductivity. For example, the thermal conductivity measurements can be utilized to calculate density changes in the fluid and calculate an effective settling rate useful for modeling sag in the wellbore. Accordingly, the thermal conductivity can be utilized to calculate the fluid density and the changes that can occur because of fluid composition, rheology, temperature and/or pressure.

As noted hereinabove, the apparatus I can be configured to take thermal conductivity measurements at a plurality of locations within the sample cell 2. The apparatus I can comprise a plurality of temperature sensors 6 and associated heat sources (e.g., power resistors) 7 and/or can comprise an axially movable thermal conductivity sensor 5 configured to take thermal conductivity measurements at the plurality of locations within the sample cell 2. An axially movable thermal conductivity sensor 5 may be particularly suited for low or unpressurized embodiments.

Also disclosed herein is a method of determining sag of a sample of fluid. The method can comprise positioning a drilling fluid 3 in a sample cell 2 of an apparatus I of this disclosure; rotating the sample cell 2; and substantially continuously or periodically measuring the thermal conductivity of the drilling fluid 3 with the thermal conductivity sensor 5 and calculating a sag of the drilling fluid 3 from the measured thermal conductivity. The method can further comprise conditioning and/or heating the drilling fluid 3 prior to measuring the thermal conductivity of the drilling fluid 3. For example, conditioning durations could range from zero (i.e., no conditioning) to in excess of a week, at temperatures ranging from ambient to about 600° F. For higher temperature operation, materials, insulation, and vessel design can be configured to support the high-temperature operation.

Rotating the sample cell 2 can further comprise rotating the sample cell 2 at an angle, wherein the angle comprises an angle of the central axis 13 of the sample cell 2 from horizontal or vertical. The angle of the rotation can be in a range of from about 0 to about 90 degrees (°), from about 0 to about 60°, from about 30 to about 600, or from about 30 to about 90°, or equal to about 30, 40, 45, or 50° from vertical or horizontal, in embodiments.

As noted hereinabove in embodiments, a plurality of temperature sensors 6 are positioned within the interior 8' of the sensor housing 8. In embodiments, a plurality of heat sources (e.g., power resistors) 7 are positioned within the interior 8' of the sensor housing (8). In such embodiments, the apparatus I can be configured to measure thermal conductivity at a plurality of locations within the sample cell 2, and the method can further comprise substantially continuously or periodically measuring the thermal conductivity of the drilling fluid (3) at each of the plurality of locations and calculating the sag of the drilling fluid 3 from the measured thermal conductivity at each of the plurality of locations. Apparatus I can thus comprise a plurality of temperature sensors 6 and associated heat sources (e.g., power resistors) 7. Alternatively or additionally, as described hereinabove, apparatus I can comprise an axially movable thermal conductivity sensor 5 configured to take the thermal conductivity measurements at the plurality of locations within the sample cell 2.

In embodiments, a sag roller oven substantially as described in U.S. Pat. No. 10,914,664, the disclosure of which is hereby incorporated herein in its entirety for purposes not contrary to this disclosure, can be adapted for incorporation of a thermal conductivity sensor 5, as per this disclosure, and utilized for the measurement of thermal conductivity and determination of sag utilizing the measured thermal conductivity.

The disclosed apparatus I and method can be utilized to eliminate tedious sample cell 2 disassembly and decanting of fluid 3 conventionally utilized to measure the density using traditional methods. Via the apparatus I and method of this disclosure, sag can be observed in real time. Additionally, delayed temperature rise of the sample of fluid 3 due to poor heat transfer can be measured via the herein disclosed apparatus I and method, thus providing for a better sense of time at the actual test temperature.

In embodiments, multiple thermal conductivity sensors 5 can be placed in the sample cell 2 to map the settling of the barite (or any weighting material). As noted hereinabove, in embodiments, thermal conductivity measurements can be taken at different parts of the sample cell 2, for example, via the use of multiple thermal conductivity sensors 5 and/or the use of an axially movable sensor (e.g., movable along central axis 13 of sample cell 2.

In embodiments, the herein disclosed apparatus I and method provide for automated measurement of thermal conductivity and calculation of sag therefrom.

Without limitation, advantages provided via the apparatus I and method of this disclosure can include the ability to test the fluid at higher temperatures than standard ambient test temperatures, with the further ability to record these processes for later relating to the properties, composition, and indicated performance of the fluid with respect to the resistance to sag. Advantages can further include, as noted above, the in-situ or real-time measurement of the fluid thermal conductivity rather than waiting until after the aging process has completed for measurement. This can, in embodiments, enable action and/or detection in earlier phases of the testing process. For example, such earlier detection can influence critical operations during an oil well drilling process. Additionally, automating the process can reduce or eliminate potential errors that may be induced via manual measurements by different users of the measurement equipment.

Other advantages will be apparent to those of skill in the art and with the help of this disclosure.

EXAMPLE

The embodiments having been generally described, the following examples are given as particular examples to demonstrate the practice and advantages of this disclosure. It is understood that the examples are given by way of illustration and are not intended to limit the specification or the claims in any manner.

Figure 2A:
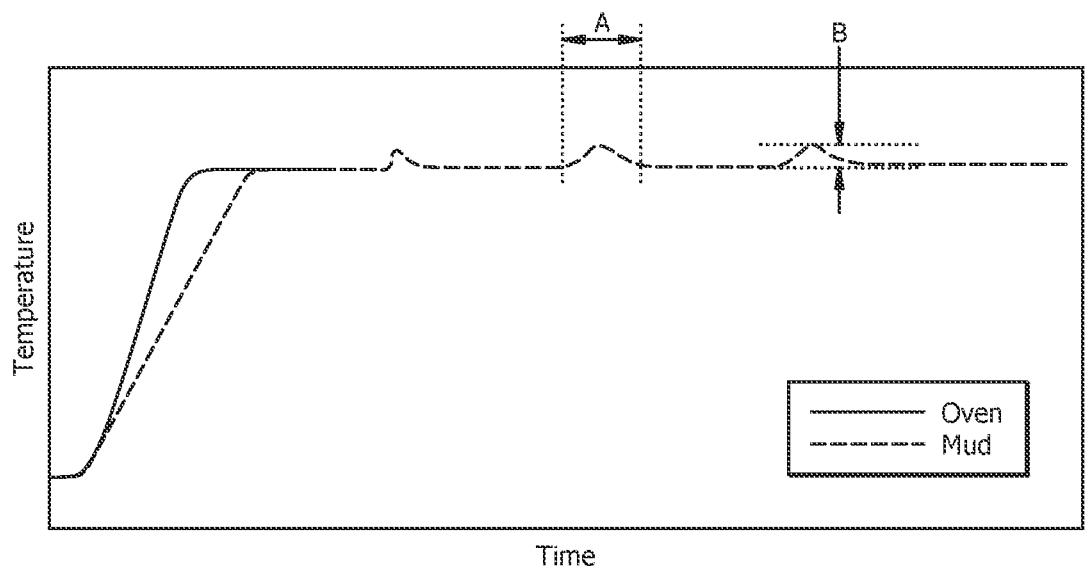
FIG. 2A is a plot of temperature vs. time, according to embodiments of this disclosure.
Figure 2B:
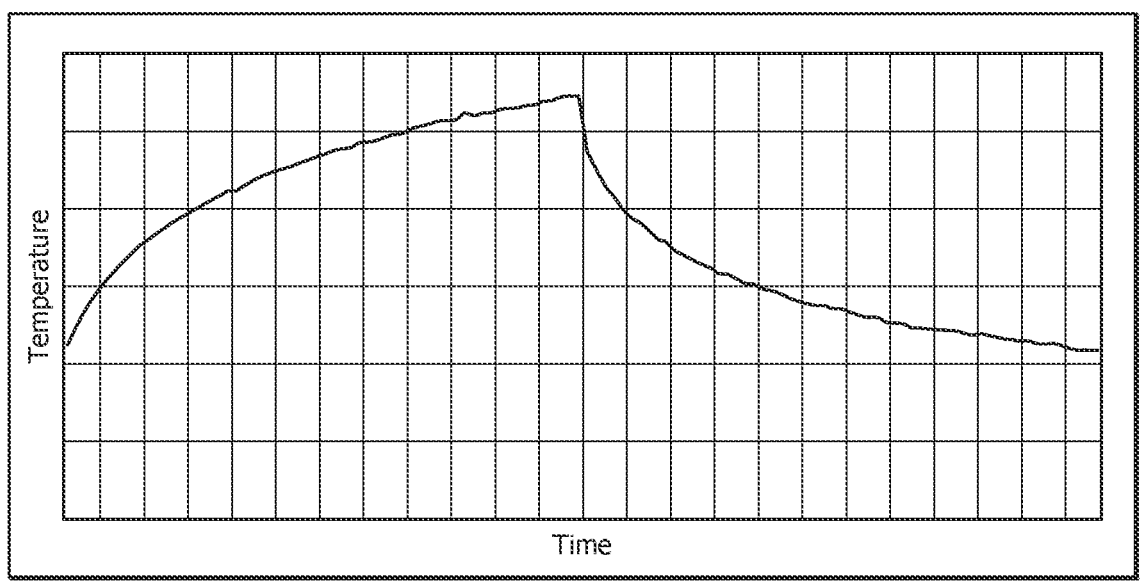
FIG. 2B is a plot of temperature vs. time, according to embodiments of this disclosure.

FIG. 2A and FIG. 2B are example schematics of temperature vs. time of the oven 1 and the mud (drilling fluid 3) that can be provided by an exemplary apparatus of this disclosure and utilized for temperature monitoring and thermal conductivity measurement for sag determination. From the temperature vs. time plot, a sag influenced peak duration A from the thermal conductivity sensor 5 and sag influenced peak height B from the thermal conductivity sensor 5 can be determined and/or monitored. In embodiments, the peak height B, width A. and known heat pulse can be utilized to provide a means to calculate the thermal conductivity of the fluid in proximity to the sensor. The measured thermal conductivity can the calibrated relative to fluid composition. The fluid components that can impact the correlation of thermal conductivity to density may include the base fluid, weighting materials, lost circulation materials, oil water ratio, water phase salinity, or a combination thereof.

In embodiments, the thermal conductivity can be determined as a function of the steady state logarithmic increase of temperature with respect to time. When the steady state temperature is plotted with respect to the natural logarithm of time, a regression calculation for best fit line of that steady state portion of the curve can be calculated. The slope of that best-fit regression line can be directly proportional to the thermal conductivity of the fluid.

The measured settling rates or density changes with respect to time can be useful in modeling real time drilling practices. For example, if the settling rates are deemed too high, such that they may cause a downhole pressure management problem, the actions at the rig can be implemented to slow the settling rate by adding treatment to the fluid system. In some cases, for example, a viscosifier may be added to the system to slow the settling rate. In some cases, when using an oil base invert emulsion fluid, the oil water ratio may be changed by adding brine to the fluid system, thus increasing the viscosity and slowing the settling rate.

Alternatively or additionally, operational changes at the rig site may be employed. For example, connection times may be closely monitored and adhered to such that the settling or sag downhole does not have sufficient time to become a problem. In some cases, if the well is to be shut in for an extended period, the fluid system may be conditioned with rheology modifiers (gelling materials) and viscosifiers to reduce or eliminate settling. Generally, the fluid can be displaced and reconditioned before normal drilling operations may resume.

Additional Disclosure

The following are non-limiting, specific embodiments in accordance with the present disclosure:

In a first embodiment, an apparatus (I) comprises: a roller oven (1) having contained therein a sample cell (2) configured to contain a sample of drilling fluid (3), wherein the sample cell (2) is supported by a cell support structure (4) and has a central axis (13); a thermal conductivity sensor (5) at least partially inserted into the sample cell (2); and a roller (10) fixedly coupled to or integrated with the cell support structure (4), wherein the roller (10) is configured to rotate about the central axis (13) and wherein the thermal conductivity sensor (5) is configured to measure a thermal conductivity of the fluid (3) in the sample cell (2) while the roller (10) is rotating.

A second embodiment can include the apparatus (1) of the first embodiment wherein the thermal conductivity sensor (5) further comprises a temperature sensor (6), a heat source (7), and a sensor housing (8), wherein the temperature sensor (6) and the heat source (7) are positioned within an interior (8') of the sensor housing (8), wherein the temperature sensor (6) is electrically connected with temperature sensor wires (6A), wherein the heat source (7) is electrically connected with heat source wires (7A), wherein the sensor housing (8) is at least partially inserted into the sample cell (2), and wherein the sensor housing (8) has a first end (8A) opposite a second end (8B) along the central axis (13) of the sample cell (2); and wherein the roller (10) further comprises a first end (10A) opposite a second end (10B) along the central axis (13), wherein the first end (10A) of the roller (10) is supported by a first bearing (9A) and is fixedly coupled to or integrated with a first end (4A) of the cell support structure (4) and wherein the second end (10B) of the roller (10) is supported by a second bearing (9B) and is fixedly coupled to or integrated with a second end (4B) of the cell support structure (4); the apparatus (I) further comprising: a plurality of slip rings (11) positioned about the first end (10A) of the roller (10); and fixed contacts (12) comprising a first fixed contact (12A) and a second fixed contact (12B), wherein the temperature sensor wires (6A) electrically connect the temperature sensor (6) and the first fixed contact (12A) via stationary contacts (12A') of first fixed contact (12A) and rotating contacts (6A'), wherein the rotating contacts (6A') are configured to rotate with rotation of the roller (10), wherein the stationary contacts (12A') of the first fixed contact (12A) are configured to remain fixed during rotation of the roller (10), and wherein each of the stationary contacts (12A') of the first fixed contact (12A) is bounded by a slip ring (11) of the plurality of slip rings (11); and wherein the heat source (e.g., power resistor) wires (7A) electrically connect the heat source (e.g., power resistor) (7) and the second fixed contact (12B) via stationary contacts (12B') of the second fixed contact (12B) and rotating contacts (7A'), wherein the rotating contacts (7B') are configured to rotate with rotation of the roller (10) and wherein the stationary contacts (12B') of second fixed contact (12B) are configured to remain fixed during rotation of the roller (10), and wherein each of the stationary contacts (12B') of the second fixed contact (12B) is bounded by a slip ring (11) of the plurality of slip rings (11).

A third embodiment can include the apparatus of the first or second embodiment further comprising a plug (14) removably connected to the second end (8B) of the sensor housing (8), and through which the temperature sensor wires (6A) and the heat source (e.g., power resistor) wires (7A) pass, wherein the plug can be disconnected from the second end (8B) of the sensor housing (8) during loading and unloading of drilling fluid (3) from the sample cell (2).

A fourth embodiment can include the embodiment of any one of the second to third embodiments, wherein a plurality of temperature sensors (6) and heat sources (e.g., power resistors) (7) are positioned within the interior (8') of the sensor housing (8) along a length L thereof within the sample cell (2), wherein each of the temperature sensors (6) is electrically connected, via temperature sensor wires (6A), with the or another first fixed contact (12A) via stationary contacts (12A') of the or the another first fixed contact (12A) and rotating contacts (6A'), wherein the rotating contacts (6A') are configured to rotate with rotation of the roller (10), wherein the stationary contacts (12A') of the or the another first fixed contact (12A) are configured to remain fixed during rotation of the roller (10), and wherein each of the stationary contacts (12A') of the or the another first fixed contact (12A) is bounded by a slip ring (11) of the plurality of slip rings (11), and wherein each of the heat sources (e.g., power resistors) (7) is electrically connected, via heat source (e.g., power resistor) wires (7A), with the or another second fixed contact (12B) via stationary contacts (12B') of the or the another second fixed contact (12B) and rotating contacts (7A'), wherein the rotating contacts (7B') are configured to rotate with rotation of the roller (10) and wherein the stationary contacts (12B') of the or the another second fixed contact (12B) are configured to remain fixed during rotation of the roller (10), and wherein each of the stationary contacts (12B') of the or the another second fixed contact (12B) is bounded by a slip ring (11) of the plurality of slip rings (11).

A fifth embodiment can include the apparatus of any one of the first to fourth embodiments, wherein the sample cell (2) is configured to be pressurized.

A sixth embodiment can include the apparatus of any one of the first to fifth embodiments further comprising a motor (20) configured to rotate sample cell (2) about the central axis (13) of the sample cell (2).

A seventh embodiment can include the apparatus of any one of the first to sixth embodiments further comprising a processor (15) electrically coupled with the first fixed contact (12A), the second fixed contact (12B), and the motor (20), wherein the processor (15) is configured to control operation of the thermal conductivity sensor (5) and the motor (20) via a programmed method for sag determination, wherein the method is stored in a memory of the processor (15), and wherein the processor (15) is further configured to process electrical signals received from the thermal conductivity sensor (5) to provide a measured thermal conductivity and determine a sag of the drilling fluid (3) from the measured thermal conductivity.

An eighth embodiment can include the apparatus of the seventh embodiment, wherein the processor (15) is configured to determine a density of the drilling fluid (3) as a function of the measured thermal conductivity.

A ninth embodiment can include the apparatus of any one of the seventh or eighth embodiments, wherein the apparatus (I) is operable to determine the sag substantially in real time.

A tenth embodiment can include the apparatus of any one of the first to ninth embodiments, wherein the apparatus (I) is configured to determine thermal conductivity measurements at a plurality of locations within the sample cell (2).

An eleventh embodiment can include the apparatus of the tenth embodiment, comprising a plurality of temperature sensors (6) and associated heat sources (e.g., power resistors) (7) and/or comprises an axially movable thermal conductivity sensor (5) configured to take thermal conductivity measurements at the plurality of locations within the sample cell (2).

In a twelfth embodiment, an apparatus (I) comprises: an oven (1) having contained therein a sample cell (2) configured to contain a sample of drilling fluid (3), wherein the sample cell (2) is supported by a cell support structure (4); a thermal conductivity sensor (5) comprising a temperature sensor (6), a heat source (7) (e.g., a power resistor or another heat source that provides a well-defined heat pulse), and a sensor housing (8), wherein the temperature sensor (6) and the power resistor (7) are positioned within an interior 8' of the sensor housing (8), wherein the temperature sensor (6) is electrically connected with temperature sensor wires (6A), wherein the heat source (e.g., power resistor) (7) is electrically connected with heat source (e.g., power resistor) wires (7A), wherein the sensor housing (8) is at least partially inserted into the sample cell (2), and wherein the sensor housing (8) has a first end (8A) opposite a second end (8B) along a central axis (13) of the sample cell (2); a roller (10) having a first end (10A) opposite a second end (10B) along the central axis (13), wherein the first end (10A) of the roller (10) is supported by a first bearing (9A) and is fixedly coupled to or integrated with a first end (4A) of the cell support structure (4) and wherein the second end (10B) of the roller (10) is supported by a second bearing (9B) and is fixedly coupled to or integrated with a second end (4B) of the cell support structure (4); a plurality of slip rings (11) positioned about the first end (10A) of the roller (10); fixed contacts (12) comprising a first fixed contact (12A) and a second fixed contact (12B), wherein the temperature sensor wires (6A) electrically connect the temperature sensor (6) and the first fixed contact (12A) via stationary contacts (12A') of first fixed contact (12A) and rotating contacts (6A'), wherein the rotating contacts (6A') are configured to rotate with rotation of the roller (10), wherein the stationary contacts (12A') of the first fixed contact (12A) are configured to remain fixed during rotation of the roller (10), and wherein each of the stationary contacts (12A') of the first fixed contact (12A) is bounded by a slip ring (11) of the plurality of slip rings (11); and wherein the heat source (e.g., power resistor) wires (7A) electrically connect the heat source (e.g., power resistor) (7) and the second fixed contact (12B) via stationary contacts (12B') of the second fixed contact (12B) and rotating contacts (7A'), wherein the rotating contacts (7B') are configured to rotate with rotation of the roller (10) and wherein the stationary contacts (12B') of the second fixed contact (12B) are configured to remain fixed during rotation of the roller (10), and wherein each of the stationary contacts (12B') of the second fixed contact (12B) is bounded by a slip ring (11) of the plurality of slip rings (11).

In a thirteenth embodiment, a method comprises: positioning a drilling fluid (3) in a sample cell (2) of an apparatus (I) of any one of the first to twelfth embodiments; rotating the sample cell (2); and substantially continuously or periodically measuring the thermal conductivity of the drilling fluid (3) with the thermal conductivity sensor (5) and calculating a sag of the drilling fluid (3) from the measured thermal conductivity.

A fourteenth embodiment can include the method of the thirteenth embodiment further comprising conditioning and heating the drilling fluid (3) prior to measuring the thermal conductivity of the drilling fluid (3).

A fifteenth embodiment can include the method of any one of the thirteenth or fourteenth embodiments, wherein rotating the sample cell (2) further comprises rotating the sample cell (2) at an angle, wherein the angle comprises an angle of the central axis (13) of the sample cell (2) from vertical or horizontal that is in a range of from about 0 to about 90 degrees (°), from about 0 to about 60°, from about 30 to about 60°, or from about 30 to about 90°, or equal to about 30, 40, 45, or 50° from vertical or horizontal.

A sixteenth embodiment can include the method of any one of the thirteenth to fifteenth embodiments, wherein a plurality of temperature sensors (6) are positioned within the interior (8') of the sensor housing (8).

A seventeenth embodiment can include the method of the sixteenth embodiment, wherein a plurality of heat sources (e.g., power resistors) (7) are positioned within the interior (8') of the sensor housing (8).

An eighteenth embodiment can include the method of any one of the thirteenth to seventeenth embodiments, wherein the apparatus (I) is configured to measure thermal conductivity at a plurality of locations within the sample cell (2), and wherein the method further comprising substantially continuously or periodically measuring the thermal conductivity of the drilling fluid (3) at each of the plurality of locations and calculate the sag of the drilling fluid (3) from the measured thermal conductivity at each of the plurality of locations.

A nineteenth embodiment can include the method of the eighteenth embodiment, wherein the apparatus (1) comprises a plurality of temperature sensors (6) and associated heat sources (e.g., power resistors) (7) and/or comprises an axially movable thermal conductivity sensor (5) configured to take the thermal conductivity measurements at the plurality of locations within the sample cell (2).

In a twentieth embodiment, a system comprises: the apparatus of any one of the first to twelfth embodiments; a processor; and a memory, wherein the memory stores a processing application, wherein the processing application, when executed on the processor, configures the processor to: substantially continuously or periodically receive signals from the apparatus to provide a measured thermal conductivity; and calculate a sag of the drilling fluid (3) from the measured thermal conductivity.

A twenty first embodiment can include the system of the twentieth embodiment, wherein the apparatus (I) is configured to take thermal conductivity measurements at a plurality of locations within the sample cell (2).

A twenty second embodiment can include the system of the twenty first embodiment, wherein the apparatus (I) comprises a plurality of temperature sensors (6) and associated heat sources (e.g., power resistors) (7) and/or comprises an axially movable thermal conductivity sensor (5) configured to take thermal conductivity measurements at the plurality of locations within the sample cell (2).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru—R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. An apparatus comprising:
a roller oven having contained therein a sample cell configured to contain a sample of drilling fluid, wherein the sample cell is supported by a cell support structure and has a central axis;
a sensor housing containing a temperature sensor, and a heat source, wherein the temperature sensor and the heat source are positioned within an interior of the sensor housing, wherein the temperature sensor is electrically connected with temperature sensor wires, wherein the heat source is electrically connected with heat source wires, wherein the sensor housing is at least partially inserted into the sample cell, and wherein the sensor housing has a first end opposite a second end along the central axis of the sample cell; and
a roller fixedly coupled to or integrated with the cell support structure, wherein the roller is configured to rotate about the central axis and wherein the temperature sensor is configured to measure a temperature of the fluid in the sample cell while the roller is rotating;
wherein the roller further comprises a first end opposite a second end along the central axis, wherein the first end of the roller is supported by a first bearing and is fixedly coupled to or integrated with a first end of the cell support structure and wherein the second end of the roller is supported by a second bearing and is fixedly coupled to or integrated with a second end of the cell support structure; and
wherein the apparatus further comprises:
a plurality of slip rings positioned about the first end of the roller; and
fixed contacts comprising a first fixed contact and a second fixed contact, wherein the temperature sensor wires electrically connect the temperature sensor and the first fixed contact via stationary contacts of first fixed contact and rotating contacts, wherein the rotating contacts are configured to rotate with rotation of the roller, wherein the stationary contacts of the first fixed contact are configured to remain fixed during rotation of the roller, and wherein each of the stationary contacts of the first fixed contact is bounded by a slip ring of the plurality of slip rings; and wherein the heat source wires electrically connect the heat source and the second fixed contact via stationary contacts of the second fixed contact and rotating contacts, wherein the rotating contacts are configured to rotate with rotation of the roller and wherein the stationary contacts of second fixed contact are configured to remain fixed during rotation of the roller, and wherein each of the stationary contacts of the second fixed contact is bounded by a slip ring of the plurality of slip rings.

2. The apparatus of claim 1, wherein the sample cell is configured to be pressurized.

3. The apparatus of claim 1 further comprising a motor configured to rotate sample cell about the central axis of the sample cell.

4. The apparatus of claim 1 further comprising a processor electrically coupled with the plurality of temperature sensors and heat sources and a motor, wherein the motor is configured to rotate the sample cell about the central axis of the sample cell, and wherein the processor is configured to control operation of the apparatus via a programmed method for sag determination, wherein the method is stored in a memory of the processor, and wherein the processor is further configured to process electrical signals received from the plurality of temperature sensors to provide a measured thermal conductivity and determine a sag of the drilling fluid from the measured thermal conductivity.

5. The apparatus of claim, 4, wherein the processor is configured to determine a density of the drilling fluid as a function of the measured thermal conductivity.

6. The apparatus of claim 4, wherein the apparatus is operable to determine the sag in real time.

7. The apparatus of claim 1, wherein the apparatus is configured to determine thermal conductivity measurements at a plurality of locations within the sample cell.

8. The apparatus of claim 7, wherein the apparatus comprises a plurality of temperature sensors and associated heat sources and/or comprises an axially movable temperature sensor and associated heat source configured to take temperature measurements at the plurality of locations within the sample cell.

9. The apparatus of claim 1 further comprising a plug removably connected to the sensor housing, and through which the temperature sensor wires and the heat source wires pass, wherein the plug can be disconnected from the sensor housing during loading and unloading of drilling fluid from the sample cell.

10. An apparatus comprising:
a roller oven having contained therein a sample cell configured to contain a sample of drilling fluid, wherein the sample cell is supported by a cell support structure and has a central axis;
a roller fixedly coupled to or integrated with the cell support structure, wherein the roller is configured to rotate about the central axis; and
a plurality of temperature sensors and heat sources arepositioned within the interior of a sensor housing along a length thereof within the sample cell, wherein each of the temperature sensors is electrically connected, via temperature sensor wires, with the or another first fixed contact via stationary contacts of the or the another first fixed contact and rotating contacts, wherein the rotating contacts are configured to rotate with rotation of the roller, wherein the stationary contacts of the or the another first fixed contact are configured to remain fixed during rotation of the roller, and wherein each of the stationary contacts of the or the another first fixed contact is bounded by a slip ring of the plurality of slip rings, and wherein each of the heat sources is electrically connected, via heat source wires, with the or another second fixed contact via stationary contacts of the or the another second fixed contact and rotating contacts, wherein the rotating contacts are configured to rotate with rotation of the roller and wherein the stationary contacts of the or the another second fixed contact are configured to remain fixed during rotation of the roller, and wherein each of the stationary contacts of the or the another second fixed contact is bounded by a slip ring of the plurality of slip rings,
wherein the plurality of temperature sensors are configured to measure a temperature of the fluid in the sample cell while the roller is rotating.

11. A method comprising:
positioning a drilling fluid in a sample cell of an apparatus;
rotating the sample cell; and
continuously or periodically measuring the thermal conductivity of the drilling fluid and calculating a sag of the drilling fluid from the measured thermal conductivity,
wherein the apparatus comprises:
a roller oven having contained therein a sample cell configured to contain a sample of drilling fluid, wherein the sample cell is supported by a cell support structure and has a central axis;
a sensor housing containing a temperature sensor, and a heat source, wherein the temperature sensor and the heat source are positioned within an interior of the sensor housing, wherein the temperature sensor is electrically connected with temperature sensor wires, wherein the heat source is electrically connected with heat source wires, wherein the sensor housing is at least partially inserted into the sample cell, and wherein the sensor housing has a first end opposite a second end along the central axis of the sample cell; and
a roller fixedly coupled to or integrated with the cell support structure, wherein the roller is configured to rotate about the central axis and wherein the temperature sensor is configured to measure a temperature of the fluid in the sample cell while the roller is rotating,
wherein the roller further comprises a first end opposite a second end along the central axis, wherein the first end of the roller is supported by a first bearing and is fixedly coupled to or integrated with a first end of the cell support structure and wherein the second end of the roller is supported by a second bearing and is fixedly coupled to or integrated with a second end of the cell support structure; and
wherein the apparatus further comprises:
a plurality of slip rings positioned about the first end of the roller; and
fixed contacts comprising a first fixed contact and a second fixed contact, wherein the temperature sensor wires electrically connect the temperature sensor and the first fixed contact via stationary contacts of first fixed contact and rotating contacts, wherein the rotating contacts are configured to rotate with rotation of the roller, wherein the stationary contacts of the first fixed contact are configured to remain fixed during rotation of the roller, and wherein each of the stationary contacts of the first fixed contact is bounded by a slip ring of the plurality of slip rings;
and wherein the heat source wires electrically connect the heat source and the second fixed contact via stationary contacts of the second fixed contact and rotating contacts, wherein the rotating contacts are configured to rotate with rotation of the roller and wherein the stationary contacts of second fixed contact are configured to remain fixed during rotation of the roller, and wherein each of the stationary contacts of the second fixed contact is bounded by a slip ring of the plurality of slip rings.

12. The method of claim 11 further comprising conditioning and/or heating the drilling fluid prior to measuring the thermal conductivity of the drilling fluid.

13. The method of claim 11, wherein rotating the sample cell further comprises rotating the sample cell at an angle, wherein the angle comprises an angle of the central axis of the sample cell from vertical that is in a range of from about 0 to about 90 degrees)(°), from about 0 to about 60°, from about 30 to about 60°, or from about 30 to about 90°, or equal to about 30, 40, 45, or 50° from vertical.

14. The method of claim 11, wherein a plurality of temperature sensors are positioned within the interior of the sensor housing.

15. The method of claim 14, wherein a plurality of heat sources are positioned within the interior of the sensor housing.

16. The method of claim 11, wherein the apparatus is configured to measure thermal conductivity at a plurality of locations within the sample cell, and wherein the method further comprising continuously or periodically measuring the thermal conductivity of the drilling fluid at each of the plurality of locations and calculate the sag of the drilling fluid from the measured thermal conductivity at each of the plurality of locations.

17. The method of claim 16, wherein the apparatus comprises a plurality of temperature sensors and associated heat sources and/or comprises an axially movable temperature sensor and associated heat source configured to take the temperature measurements at the plurality of locations within the sample cell.

18. A system comprising:

an apparatus comprising a roller oven having contained therein a sample cell configured to contain a sample of drilling fluid, wherein the sample cell is supported by a cell support structure and has a central axis; a sensor housing containing a temperature sensor, and a heat source, wherein the temperature sensor and the heat source are positioned within an interior of the sensor housing, wherein the temperature sensor is electrically connected with temperature sensor wires, wherein the heat source is electrically connected with heat source wires, wherein the sensor housing is at least partially inserted into the sample cell, and wherein the sensor housing has a first end opposite a second end along the central axis of the sample cell; and a roller fixedly coupled to or integrated with the cell support structure, wherein the roller is configured to rotate about the central axis and wherein the temperature sensor is configured to measure a temperature of the fluid in the sample cell while the roller is rotating, wherein the roller further comprises a first end opposite a second end along the central axis, wherein the first end of the roller is supported by a first bearing and is fixedly coupled to or integrated with a first end of the cell support structure and wherein the second end of the roller is supported by a second bearing and is fixedly coupled to or integrated with a second end of the cell support structure; and wherein the apparatus further comprises: a plurality of slip rings positioned about the first end of the roller; and fixed contacts comprising a first fixed contact and a second fixed contact, wherein the temperature sensor wires electrically connect the temperature sensor and the first fixed contact via stationary contacts of first fixed contact and rotating contacts, wherein the rotating contacts are configured to rotate with rotation of the roller, wherein the stationary contacts of the first fixed contact are configured to remain fixed during rotation of the roller, and wherein each of the stationary contacts of the first fixed contact is bounded by a slip ring of the plurality of slip rings; and wherein the heat source wires electrically connect the heat source and the second fixed contact via stationary contacts of the second fixed contact and rotating contacts, wherein the rotating contacts are configured to rotate with rotation of the roller and wherein the stationary contacts of second fixed contact are configured to remain fixed during rotation of the roller, and wherein each of the stationary contacts of the second fixed contact is bounded by a slip ring of the plurality of slip rings;

a processor; and a memory, wherein the memory stores a processing application, wherein the processing application, when executed on the processor, configures the processor to:

continuously or periodically receive signals from the apparatus to provide a measured thermal conductivity; and calculate a sag of the drilling fluid from the measured thermal conductivity.

19. The system of claim 18, wherein the apparatus is configured to take temperature measurements at a plurality of locations within the sample cell.

20. The system of claim 19, wherein the apparatus comprises a plurality of temperature sensors and associated heat sources and/or comprises an axially movable temperature sensor configured to take temperature measurements at the plurality of locations within the sample cell.

* * * * *